UNITED STATES PATENT OFFICE.

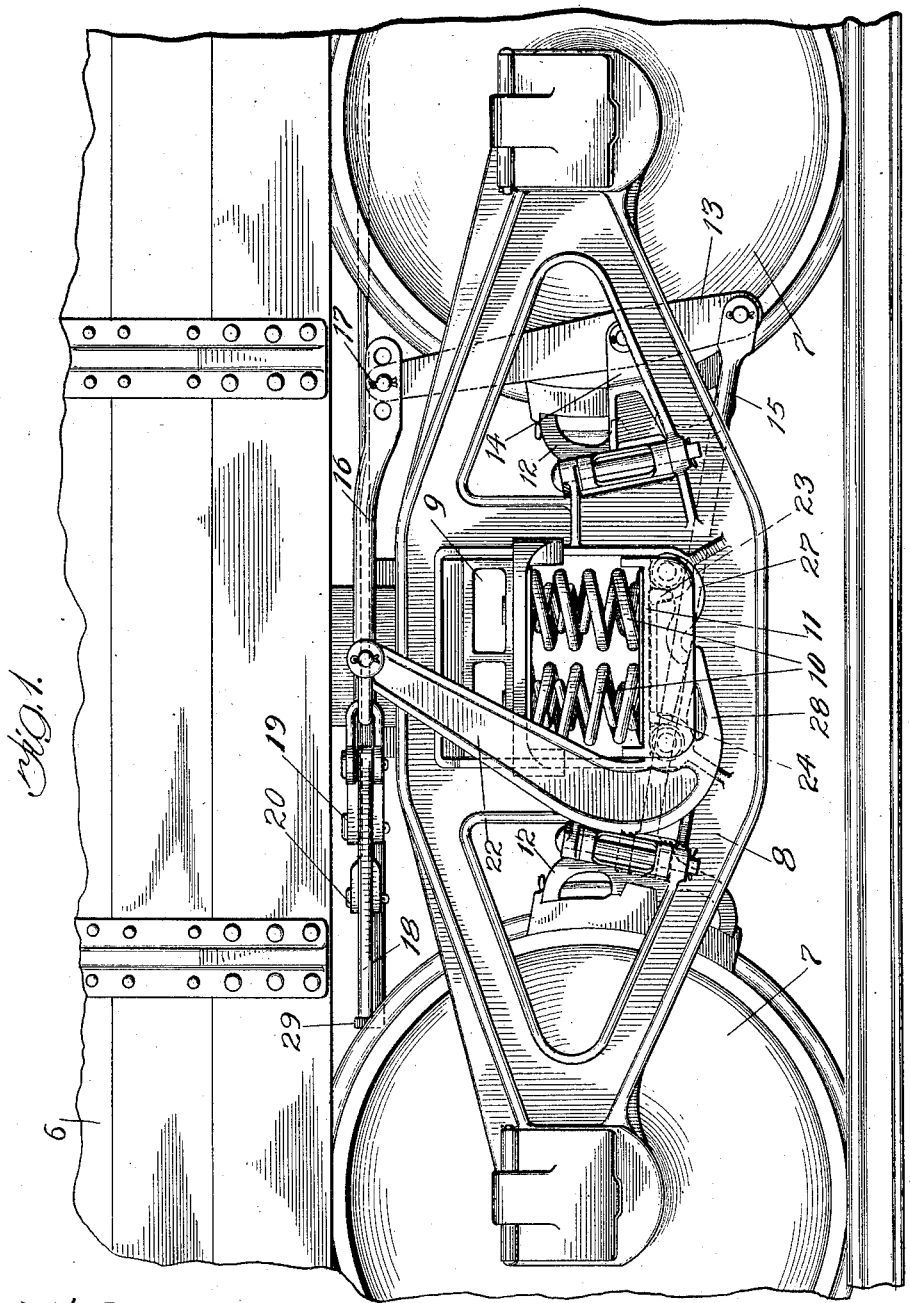

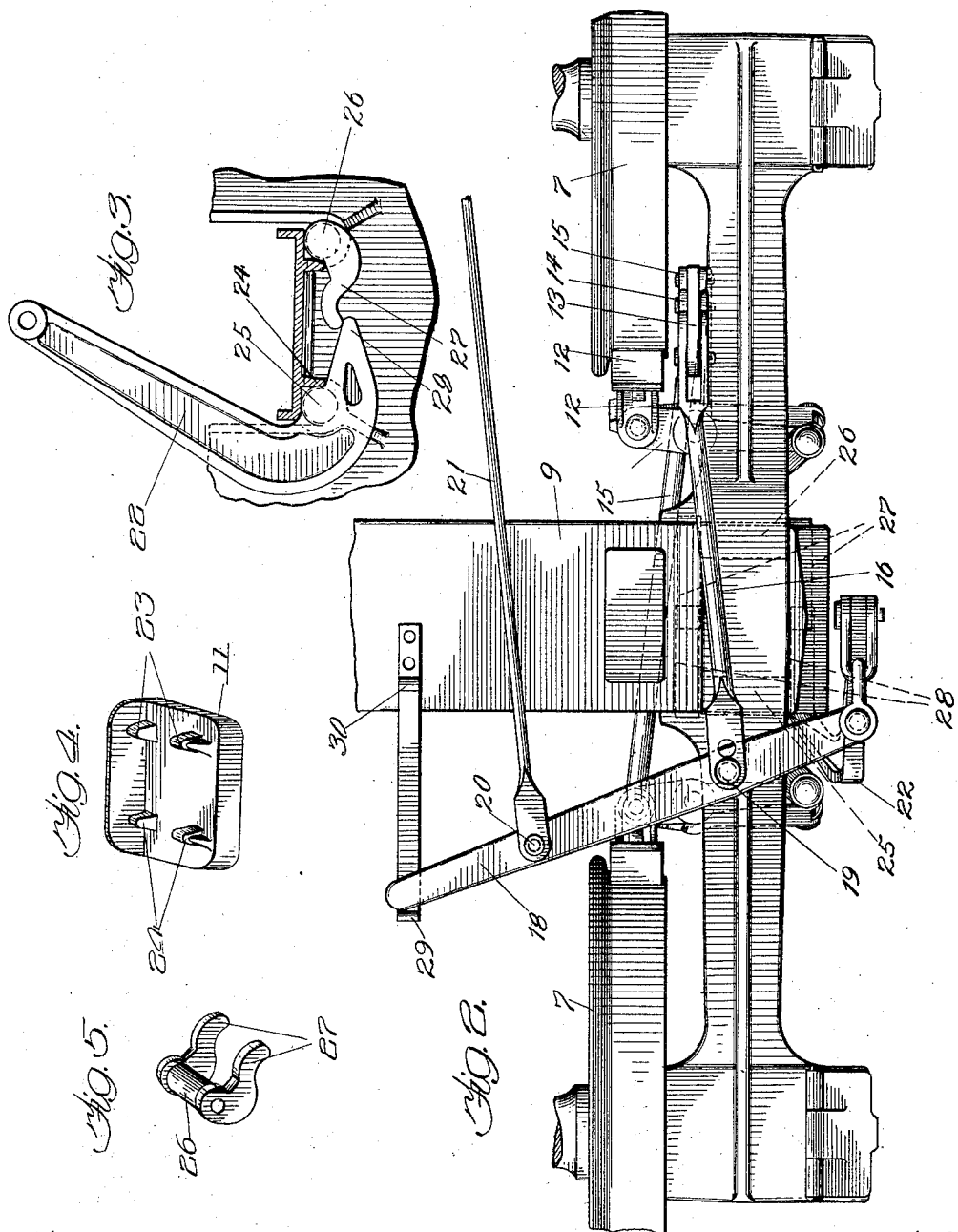

WILLARD G. RANSOM, OF DAVENPORT, IOWA.

VARIABLE-LOAD BRAKE MECHANISM.

1,016,289. Specification of Letters Patent. Patented Feb. 6, 1912.

Application filed April 7, 1911. Serial No. 619,486.

*To all whom it may concern:*

Be it known that I, WILLARD G. RANSOM, a citizen of the United States of America, and resident of Davenport, Scott county, Iowa, have invented a certain new and useful Improvement in Variable-Load Brake Mechanism, of which the following is a specification.

My invention relates to variable load brake mechanism, in which the pressure upon the brake shoes is dependent upon the weight of the load carried by the car truck. In trains in which the cars are unequally loaded, and sufficient braking pressure is applied to stop the heavily loaded cars in a comparatively short space, the same pressure applied to the lightly loaded cars would be so great as to cause the wheels thereof to skid.

The object of my invention is to overcome the above defect by providing a brake gearing, which gearing includes those parts employed to transmit power from the source of brake actuating power to the brake shoes, which when the brake-actuating force reaches a certain percentage of the weight supported by a given part of the car structure will change the rate of increase of pressure on the brake shoes as compared with the rate of increase of the brake-actuating force.

In most of the load controlled brakes heretofore attempted, three general principles have been followed: One involves a special design of pneumatic brake-actuating mechanism subject to control by the changing load on some part of the car structure; the second involves a set of levers one of which is provided with a shifting fulcrum, and the third comprises a system of equalized levers so arranged that the actual pressure on any brake shoe is limited to some predetermined percentage of the weight on some part or parts of the car structure. The system embodying the first of these principles carries with it the objection that it requires a change in air-brake parts, thus causing the attendant difficulties of operation when using brake-actuating mechanism of different classes, which are supposed to work harmoniously together. The second system usually requires a complicated mechanism involving a shifting pin in a slot or sliding fulcrum, and is objectionable for this reason. In the third system, a maximum limit of brake-shoe pressure is placed on the empty car, which limit may be reached at a low cylinder pressure with pneumatic brake-actuating power, while cars with other brake equipment when empty will not receive an equal brake pressure until a much greater cylinder pressure is obtained.

By my invention, I have combined a lifting mechanism with a lever in such a manner that when the car is loaded and the brake-actuating force insufficient to lift the said car body and load, the lever will act as a simple lever with one end fulcrumed to the load lifting crank or lever, and the other end receiving the brake-actuating force, while at some intermediate point a connection is made which transmits force to the brake shoes by a simple brake lever system. When the car is empty or lightly loaded, and the brake-actuating force is sufficient to lift the load, then through the motion of lifting the load the before-mentioned simple lever is moved until it encounters a lever stop, at which time it becomes a compound lever with four forces acting upon it. These and other objects of my invention will be more clearly understood by reference to the accompanying drawings, in which—

Figure 1 is a side elevation of a car truck embodying my invention. Fig. 2 is a plan view of a portion of the truck. Figs. 3, 4 and 5 are detail views.

Throughout the drawings similar reference characters refer to similar parts.

I have shown a portion of a car body 6 supported by a suitable truck, which truck is supported upon the wheels 7—7 and comprises a side frame 8 of the usual well known construction, having bolster openings through which the ends of the bolster 9 project. This bolster is supported by the bolster springs 10, which springs are in turn supported upon the tray 11. The brake shoes 12 are mounted upon the side frames, and these brake shoes are connected to the vertically extending lever 13 by means of the connecting rods 14 and 15. Connected to the upper end of this lever 13 is a longitudinally extending rod 16. These levers are adjustably connected by means of a series of holes in the rod 16 in which the pin 17 is adapted to be inserted, which pin passes through the end of the lever 13 in a manner which will be clearly understood by reference to the drawings. The opposite end of this lever 16 is connected to a transversely extending lever 18 at a point such as 19. At a second point 20 upon this lever 18 there is a connection through a suitable connecting rod 21 to the source of actuating power, such as a compressed air cylinder or the like. Any suitable source of power can be used, and it is accordingly not thought necessary to illustrate the same. Connected to the outer end of this lever 18 is a weight-lifting crank or lever 22. These levers 18 and 22 are connected together by link connections shown or in any other desired manner. As clearly shown in Figs. 1 and 3, this weight-lifting lever extends downwardly and is provided with a curved lower end portion which extends beneath the tray which supports the bolster springs.

In Fig. 4 I have shown a bottom view of this tray. As there shown, it will be seen that this tray is provided with a pair of lugs 23 extending downwardly near one end thereof, and a corresponding pair of lugs 24 near the other end thereof. Between the projections 24 at the side of the bolster opening in the side frame there is journaled a short rock shaft 25, which rock shaft is connected to the weight-lifting lever, so that this weight-lifting lever 22 pivots upon this rock shaft as an axis. Journaled between the opposite lugs 23 and the other side of the bolster opening there is a second short rock shaft 26 to which are connected rocking fingers 27, which fingers are adapted to bear beneath the tray 11. The lower end of the weight-lifting lever is provided with a corresponding pair of fingers 28 which are adapted to bear beneath the fingers 27, as clearly shown in Figs. 1 and 3. By this construction it will be clearly seen that when an upward pressure is applied through the fingers 28 this upward pressure is transmitted to the tray 11 through these fingers 28 and the fingers 27 and the rock shafts 25 and 26, thus producing an equal upward pressure upon both ends of this tray.

Located in the path of travel of the opposite end of the lever 18 from which the rock shaft 22 is connected, there are a pair of stops 29—30, the purpose of which stops will be hereinafter pointed out.

The operation of my complete device is as follows: When the actuating power is applied through the connecting rod 21, it exerts a pull upon the lever 18 at the point 20. This pull upon the lever 18 at this point would produce a force acting in the opposite direction upon the outer end of this lever, thus tending to swing this outer end and with it the upper end of the weight-lifting lever in a direction opposite to that of the force applied to the connecting rod 21. This tendency of the upper end of the weight-lifting lever to swing to the left, as shown in Fig. 1, would tend to cause this lever to pivot upon the rock shaft 25, and thus through the intermediation of the fingers 28 and 27 tend to press upwardly upon the tray 11 which supports the bolster springs. First assuming that there is a heavy load upon the truck, the downward pressure upon the springs would be so great that the force applied through the connecting rod 21 to the weight-lifting lever will not be sufficient to cause the upward pressure of the fingers 28 to move the tray upwardly to any extent. Accordingly the weight-lifting lever will remain stationary, and, therefore, the upper end of this lever to which the lever 18 is connected will act as a stationary pivot about which the lever 18 will pivot under the influence or force exerted through the connecting rod. The levers 16 through which the braking power is transmitted to the shoes, being connected at a point between the connecting rod and the stationary end of the lever 18, the force exerted upon this lever 16 can be readily ascertained by means of the laws relating to a simple lever, as it will be noticed that at this time there are but three forces exerted upon this lever—first, the force from the power-actuating mechanism; second, the force transmitted to the brake shoes through the lever connections 16, and third, the force at the fulcrum connection with the lifting lever 22. Now, assume that the car is empty or is lightly loaded. Then when the upward pressure is applied to the under side of the tray 11, through the fingers 27 and 28, in the manner above described, the downward pressure exerted by the weight upon the bolster springs will not be sufficient to counteract this upward force and, therefore, the tray 11 will be forced upward through a small distance, thus permitting the weight-lifting lever 22 to pivot upon the rock shaft and allow the upper end of this lever to swing to the left. It will be noticed that on account of the difference in length of the two arms of this lever a slight upward movement of the fingers 28 will cause a much greater movement of the upper end of this lever. This movement of the upper end of the weight-lifting lever to which the lever 18 is fulcrumed permits this lever 18, under the influence of the force exerted through the connecting rod, to move over against the stop 30. When in this position, the force which is applied to the brake shoes through the connecting rod will be seen to be the result of four forces acting upon this lever—one at either end and the other two at the points 19 and 20; and this lever is accordingly transformed into a compound lever. The effective force through this connection 16 to the brake shoes is thus greatly diminished, thus applying a lighter braking power and one which will not cause the wheels to skid. It will, therefore, be seen that I have devised a brake-actuating mechanism in which the rate of rise of brake-shoe pressure up to the point where the load is lifted will be directly proportionate to the rate of rise in the brake-actuating force, but that after the load is lifted the rate of rise of brake-shoe pressure will be greatly reduced in proportion to the rise of the brake-actuating force as compared with the rate before lifting takes place.

While I have shown one specific form of carrying out my invention, it is understood that I do not wish to be limited by the exact construction shown.

What I claim as my invention is:

1. A variable load brake for cars, comprising a car truck having side frames, brake shoes carried by said truck, means for moving said shoes toward and from the car wheels, said means including a lever, connections from said lever to the actuating power and to said shoes, and means whereby said lever operates as a simple lever or as a compound lever, depending upon the weight of the load upon said car truck.

2. A variable load brake for cars, comprising a car truck having side frames, brake shoes carried by said truck, means for moving said shoes toward and from the car wheels, said means including a lever, a weight-lifting lever connected at its upper end to one end of said lever, a connection from said lever at another point thereon to the actuating power and a connection at a point intermediate of the two to said brake shoes, means whereby when the actuating force is applied the movement of the upper end of said weight-lifting lever depends upon the weight of the load upon said car truck, and a stop against which the opposite end of said first-mentioned lever is adapted to bear when the upper end of said weight-lifting lever has been moved through a predetermined distance.

3. A variable load brake for cars, comprising a car truck having side frames, brake shoes carried by said truck, means for moving said shoes toward and from the car wheels, said means including a lever, connections from said lever to the actuating power and to said shoes, and means whereby said lever operates under three forces under certain load conditions, and under four forces under other load conditions.

4. A variable load brake for cars comprising a car truck having side frames, brake shoes carried by said truck, means for moving said shoes toward and from the car wheels, said means including a lever, connections from said lever to the actuating power and to said shoes, and means whereby said lever operates under a limited number of forces under heavy load conditions, and under an increased number of forces under light load conditions.

5. A variable load brake for cars comprising a car truck having side frames, brake shoes carried by said truck, means for moving said shoes toward and from the car wheels, said means including a lever, connections from said lever to the actuating power and to said shoes, and means whereby said lever operates under a varying number of forces as determined by load conditions.

6. A variable load brake for cars comprising a car truck having side frames, brake shoes carried by said truck, means for moving said shoes toward and from the car wheels, said means including a lever, connections from said lever to the actuating power and to said shoes, and means whereby said lever operates under a varying number of forces as determined by the load in relation to amount of brake actuating power.

7. A variable load brake for cars comprising a car truck having side frames, brake shoes carried by said truck, means for moving said shoes toward and from the car wheels, said means including a lever, connections from said lever to the actuating power and to said shoes, and load controlled mechanism adapted to diminish but not limit the amount of brake shoe pressure when effected by the brake actuating power.

8. A variable load brake for cars, comprising a car truck having side frames, brake shoes carried by said truck, means for moving said shoes toward and from the car wheels, said means including a lever, connections from said lever to the actuating power and to said shoes, and means whereby said lever fulcrums about one end thereof under heavy load conditions, and about the other end thereof under light load conditions.

9. A variable load brake for cars, comprising a car truck having side frames, brake shoes carried by said truck, means for moving said shoes toward and from the car wheels, said means including a lever, connections from one point on said lever to the actuating power and from another point thereon to the brake shoes, and a movable fulcrum for said lever, and means whereby under heavy load conditions the connection from said lever to the brake shoes is between the fulcrum and the connection to the actuating power, and whereby under light load conditions the connection from said lever to the actuating power is between the fulcrum and the point of connection to the brake shoes.

10. A variable load brake for cars, comprising a car truck having side frames, brake shoes carried by said truck, a bolster extending through openings in said side frame, springs supporting the ends of said bolster, a weight-lifting lever having a rock arm at its lower end bearing beneath said springs, a lever extending substantially horizontal and connected to the upper end of said weight-lifting lever, and connections from said lever to the actuating power and to said brake shoes.

11. A variable load brake for cars, comprising a car truck having side frames, brake shoes carried by said truck, a bolster extending through openings in said side frame, springs supporting the ends of said bolster, a tray supporting the lower ends of said springs, a weight-lifting lever having a rock arm at its lower end bearing beneath said tray, a lever extending substantially horizontal and connected to the upper end of said weight-lifting lever, and connections from said lever to the actuating power and to said brake shoes.

12. A variable load brake for cars, comprising a car truck having side frames, brake shoes carried by said truck, a bolster extending through openings in said side frame, springs supporting the ends of said bolster, a tray supporting the lower ends of said springs, said tray provided with downwardly extending lugs near the ends thereof, a rock shaft journaled between said lugs and the sides of said bolster, a weight-lifting lever secured to said rock shaft, and connections from the upper end of said lever to the actuating power and to said brake shoes.

13. A car construction comprising a car truck having side frames, a bolster extending through openings in said frame, springs supporting the ends of said bolsters, a tray supporting the lower ends of said springs, a plurality of lugs extending downwardly from said tray near one end thereof, a rock shaft journaled between the sides of said bolster opening and said lugs, and a lever secured to the ends of said rock shaft whereby said rock shaft acts as a pivot for said lever.

14. A car construction comprising a car truck having side frames, a bolster extending through openings in said frame, springs supporting the ends of said bolsters, a tray supporting the lower ends of said springs, a pair of lugs extending downwardly from said tray near each end thereof, a rock shaft journaled between one pair of said lugs and the side of said openings in the side frame, fingers secured to said rock shaft and bearing against the bottom of said tray, a second rock shaft journaled between the other pair of said lugs and the opposite side of said opening in the side frame, a lever secured to said second rock shaft, and fingers on said lever bearing beneath the said first-mentioned fingers.

15. A variable load brake for cars, comprising a car truck having side frames, brake shoes carried by said truck, a bolster extending through openings in said side frame, springs supporting the ends of said bolster, a tray supporting the lower ends of said springs, said tray provided with a pair of downwardly extending lugs near each end thereof, a rock shaft journaled between one pair of said lugs and the side of one of said openings in the side frame, fingers secured to said rock shaft and bearing against the bottom of said tray, a weight-lifting lever pivoted between the other pair of lugs and the opposite side of said opening, said lever provided with fingers adapted to bear beneath said first-mentioned fingers, and a lever connected to the upper end of said weight-lifting lever, and connections from said lever to the actuating power and to said brake shoes.

16. A variable load brake for cars, comprising a car truck having side frames, brake shoes carried by said truck, a bolster extending through openings in said side frame, springs supporting the ends of said bolster, a tray supporting the lower ends of said springs, a weight-lifting lever pivoted below said tray and having fingers bearing against the bottom of the same, a lever connected at one end to the upper end of said weight-lifting lever, a connection from a second point on said lever to the actuating power, and a connection at a point between the first mentioned points to said brake shoes, and a stop against which the opposite end of said lever is adapted to bear when said weight-lifting lever has been rocked through the operation of said actuating power.

17. A variable load brake for cars, comprising a car truck having side frames, brake shoes carried by said truck, a bolster extending through openings in said side frames, springs supporting the ends of said bolster, a tray supporting the lower ends of said springs, said tray provided with a pair of downwardly extending lugs near each end thereof, a rock shaft journaled between one pair of said lugs and the side of one of said openings in the side frame, fingers secured to said rock shaft and bearing against the bottom of said tray, a weight-lifting lever pivoted between the other pair of lugs and the opposite side of said opening, said lever provided with fingers adapted to bear beneath said first-mentioned fingers, and a lever connected to the upper end of said weight-lifting lever, a connection from a second point on said lever to the actuating power, and a connection at a point between the first two points mentioned to said brake shoes.

18. A variable load brake for cars, comprising a car truck having side frames, brake shoes carried by said truck, a bolster extending through openings in said side frames, springs supporting the ends of said bolster, a tray supporting the lower ends of said springs, said tray provided with a pair of downwardly extending lugs near each end thereof, a rock shaft journaled between one pair of said lugs and the side of one of said openings in the side frame, fingers secured to said rock shaft and bearing against the bottom of said tray, a weight-lifting lever pivoted between the other pair of lugs and the opposite side of said opening, said lever provided with fingers adapted to bear beneath said first-mentioned fingers, and a lever connected to the upper end of said weight-lifting lever, a connection from a second point on said lever to the actuating power, a connection at a point between the first two points mentioned to said brake shoes, and a stop against which the opposite end of said lever is adapted to bear when said weight-lifting lever has been rocked through the operation of said actuating power.

Signed by me at Davenport, Iowa, this third day of April 1911.

WILLARD G. RANSOM.

Witnesses:
A. B. FRENIER,
C. G. STOLPE.

---

Copies of this patent may be obtained for five cents each, by addressing the "Commissioner of Patents, Washington, D. C."